United States Patent
Jørgensen

(10) Patent No.: US 9,578,713 B2
(45) Date of Patent: Feb. 21, 2017

(54) COLOR CONTROL SYSTEM WITH VARIABLE CALIBRATION

(71) Applicant: Martin Professional ApS, Arhus (DK)

(72) Inventor: Dennis Thykjaer Jørgensen, Roende (DK)

(73) Assignee: MARTIN PROFESSIONAL APS, Aarhus (DK)

( * ) Notice: Subject to any disclaimer, the term of this patent is extended or adjusted under 35 U.S.C. 154(b) by 0 days.

(21) Appl. No.: 14/719,261

(22) Filed: May 21, 2015

(65) Prior Publication Data

US 2015/0342002 A1    Nov. 26, 2015

(30) Foreign Application Priority Data

May 26, 2014   (EP) ..................... 14169802

(51) Int. Cl.
H05B 37/00    (2006.01)
H05B 33/08    (2006.01)

(52) U.S. Cl.
CPC ........ *H05B 33/0863* (2013.01); *H05B 33/086* (2013.01); *H05B 33/0866* (2013.01); *Y02B 20/341* (2013.01)

(58) Field of Classification Search
CPC .............. H05B 33/0863; H05B 33/086; H05B 33/0866
See application file for complete search history.

(56) References Cited

U.S. PATENT DOCUMENTS

| | | | |
|---|---|---|---|
| 2006/0285136 A1* | 12/2006 | Shin ................ | G09G 5/02 358/1.9 |
| 2008/0136334 A1* | 6/2008 | Robinson .......... | H05B 37/0254 315/151 |
| 2009/0208101 A1* | 8/2009 | Harigai ................ | H04N 1/60 382/167 |
| 2010/0072900 A1 | 3/2010 | Deppe | |
| 2011/0127930 A1* | 6/2011 | Bennette ............ | H05B 33/0863 315/312 |
| 2011/0187290 A1* | 8/2011 | Krause .............. | H05B 33/0863 315/312 |

FOREIGN PATENT DOCUMENTS

WO    2009066198 A1    5/2009

OTHER PUBLICATIONS

European Search Report for Application No. EP 14 16 9802 dated Oct. 1, 2014.

* cited by examiner

*Primary Examiner* — Tung X Le
*Assistant Examiner* — Raymond R Chai
(74) *Attorney, Agent, or Firm* — Artegis Law Group, LLP

(57) ABSTRACT

An illumination device including a plurality of LEDs emitting light in different source colors is disclosed. The device receives an input signal indicative of at least a color and/or brightness to be emitted by the illumination device. The device also stores colorimetric data. The colorimetric data is indicative of colorimetric properties of the light emitted by the plurality of LEDs, where the colorimetric properties of the LEDs define the actual color gamut of the illumination device. The device also stores a predefined color gamut data. A processing unit generates an adjusted color gamut based on the actual color gamut and the predefined color gamut and activates the plurality of LEDs based on the input signal and the adjusted color gamut.

8 Claims, 5 Drawing Sheets

COLOR CONTROL SYSTEM WITH VARIABLE CALIBRATION

CROSS-REFERENCE TO RELATED APPLICATIONS

The present application claims priority to European patent application titled, "COLOR CONTROL SYSTEM WITH VARIABLE CALIBRATION," filed on May 26, 2014 and having Application No. 14 169 802.7. The subject matter of this related application is hereby incorporated herein by reference.

TECHNICAL FIELD

The present invention relates to an illumination device, to a color control system and to a method for controlling a color of the illumination device.

BACKGROUND

Light fixtures or illumination devices creating various effects are getting more and more popular in the entertainment industry in order to create various light effects in connection with entertainment shows. Other fields of application where illumination devices having the capability of changing color are used, are applications in theatres, shops, private homes, discotheques etc.

Typically, such illumination devices with variable color light comprise a plurality of light sources, such as LEDs emitting light in different source colors, wherein the color of each illumination device is obtained by a combination of the source colors of the different light sources. The light from the different light sources is combined in the illumination device. The color of the illumination device can be varied by varying the intensity of each light source such that the combined spectral distribution of the different light sources within the illumination device varies when the intensities of the light sources are varied. This means that the color emitted by an illumination device can be changed by changing the intensity of the light sources.

Recently, the use of LEDs as light sources in an illumination device became more popular. By way of example, three different LEDs of different colors, e.g. a blue LED, a red LED and a green LED (RGB) may be used to generate different colors. For the illumination of a stage or a building, a large number of different illumination devices are normally used to generate a certain illumination. However, when light from several illumination devices is combined into one illumination, color differences might occur as the light sources used in two different illumination devices might differ. The reason for this is the fact that it is difficult to manufacture light sources emitting the exact same color and brightness.

One possibility to overcome the problem when different illumination devices are combined could be to store the spectrum of each light source and to use the spectrum of each light source to calculate the resulting color when the intensities of the light sources are varied. It can be calculated how the intensity of the different light sources should be varied in order to generate a certain target color. However, this system requires knowledge of the spectral distribution of the light sources in order to be able to perform the calculations. This requires that these spectral distributions are measured, particularly because many light fixture vendors do not specify the spectral distribution. Such a system, is known from WO 01/36864 A2.

The colors achievable by an illumination device are called the individual or actual color gamut. This color gamut can be seen as an area within a color map such as CIE 1931 color diagram and the area is defined by the color coordinate points, one for the resulting color of the individually controllable strings. It is to be understood that term light source do also include a collection of a plurality of light sources controlled by the same control signal, such that the coordinate points are obtained as a combination of all the light sources in the collection. E.g. in a typical LED device each of the primary light sources Red, Blue and Green are embodies as respectively a string of red, green and blue LED. By way of example, when three different light sources such as red, green and blue or other light sources emitting cyan, magenta and yellow are used, each light source defines a point in the color space. By way of example, when three different light sources are used, a triangle is generated by the three different light sources by combining the different points in the color space. Each illumination device has its own actual color gamut. When the color gamuts of different light fixtures are combined, a common color gamut is obtained, this common color gamut containing all colors that all the fixtures of a color control system can process simultaneously based on the light sources used by the different light fixtures. This common gamut can be a predefined gamut, e.g. defined by the manufacturer of the different light sources.

EP 1 938 666 B1 discloses a color control using the color gamut of the individual color system of each fixture.

As mentioned above, it is possible to generate each color within the common color gamut by all of the illumination devices. A color can be inter alia defined by the parameters hue and saturation. In the CIE 1931 diagram, the saturation can be seen as the distance from the centre of the color diagram corresponding to the white color to the border of the gamut. This means that the colors with 100% saturation are placed on the outer curve of the CIE diagram and the outer curve of the each individual gamut defines the maximum saturation that the illumination device can generate. As the common gamut is normally smaller than each individual gamut, the situation may occur that the obtained color generated by each of the light fixtures has a color saturation that is not satisfying when the generated colors are limited to the common gamut. Some of the light fixtures may be able to generate colors with more saturation, whereas other light fixtures are not able to generate the color with the same saturation. Thus, with current color control systems it is possible to obtain the same color from all light fixtures of a system, when colors are selected that are located within the common color gamut. This helps to obtain a uniform color output by the system; however, the saturation of the obtained colors may be poor. In other systems where the common color gamut is not taken into account, the user may obtain more saturated colors; however, the user cannot obtain uniform colors.

Thus, in view of the above-said a need exists to provide more flexibility to the user as far as color conformity or color saturation are concerned.

SUMMARY

This need is met by the features of the independent claims. Further features are described in the dependant claims.

According to a first aspect, an illumination device is provided comprising a plurality of LEDs emitting light in different source colors, the light of the illumination device being obtained by a combination of the source colors of the plurality of LEDs. The illumination device furthermore comprises an interface adapted to receive an input signal indicative of at least a color and/or a brightness to be emitted by the illumination device. Furthermore, a storage unit is provided comprising colorimetric data indicative of colorimetric properties of the light emitted by the plurality of LEDs, wherein the colorimetric properties of the LEDs define the actual color gamut of the illumination device. The storage unit furthermore comprises predefined color gamut data indicative of a predefined color gamut. The illumination device comprises a processing unit adapted to generate an activation signal for the plurality of LEDs based on the input signal wherein the processing unit is adapted to generate an adjusted color gamut based on the actual color gamut and based on the predefined color gamut, wherein the processing unit is adapted to generate the activation signal for the plurality of LEDs based on the input signal and based on the adjusted color gamut.

The illumination device is capable of generating an adjusted color gamut which is based on the actual color gamut and on the predefined color gamut and which can be a color gamut situated between the actual color gamut and the predefined color gamut. The activation signal for the LEDs and such the light to be output by the illumination device is based on the color and/or brightness information received from the input signal and based on the adjusted color gamut. The adjusted color gamut provides the possibility to control the color of the illumination device in such a way that it can be controlled to which extent the predefined or actual color gamut influences the generated light. With the adjusted color gamut it is possible to mainly base the color control on either the predefined or the actual color gamut, or to use a mixture of both gamuts. Based on the fact which gamut mainly influences the adjusted color gamut, color homogeneity or color saturation can be emphasized.

The interface may be adapted to receive an adjustment parameter, the adjustment parameter being indicative of a degree of adjustment of the predefined color gamut to the actual color gamut, wherein the processing unit is adapted to generate the adjusted color gamut based on the received adjustment parameter. The adjustment parameter provides an indication how far the adjusted color gamut corresponds to the predefined color gamut or to the actual color gamut. By way of example, when the predefined color gamut is a common color gamut common to all illumination devices of an illumination system, the adjustment parameter indicates whether or to what extent the predefined color gamut and/or the actual color gamut is used for generating the light output of the illumination device.

The processing unit can generate the adjusted color gamut based on the received adjustment parameter as interpolation between the predefined color gamut and said actual color gamut. The adjustment parameter can be an indicator of the degree of the interpolation between the predefined color gamut and the actual color gamut. The adjustment parameter may also be indicative to what extent the adjusted color gamut corresponds to the actual color gamut or to the predefined color gamut. This means that the adjustment parameter can indicate at which percentage the adjusted color gamut or the actual color gamut is used for the generation of the light. When the adjustment parameter indicates that the color to be output by the illumination device is mainly influenced by the predefined color gamut or a common color gamut of a group of illumination devices, it can be concluded that the color conformity is desired, whereas if the adjusted color gamut mainly corresponds to the individual color gamut, the color conformity may be less important but the color saturation of the individual illumination device may be improved. Based on the adjustment parameter, a flexibility is obtained whether color conformity is an important aspect in the generation of an illumination or whether the individual color of each illumination device is of greater importance.

The processing unit can generate the adjusted color gamut based on the adjustment parameter as a weighted average of the actual color gamut and the predefined color gamut. The adjustment parameter then indicates the weighting coefficients of at least one of the actual color gamut and the predefined color gamut. By way of example, the adjustment parameter can indicate that the adjusted color gamut shall correspond at 100% to the actual color gamut or 100% to the predefined color gamut or any value in-between.

Preferably, the adjustment parameter is received as part of the input signal and the processing unit is adapted to extract the adjustment parameter from the input signal and to generate the adjusted color gamut accordingly.

The adjustment parameter can be a value within a value range with an upper limit and with a lower limit. Within these two limits, one of the limits indicates that the adjusted color gamut corresponds to the predefined color gamut, wherein the other of the two limits indicates that the adjusted color gamut corresponds to the actual color gamut. The processing unit then generates the adjusted color gamut based on the value of the adjustment parameter.

By way of example, the interface at the illumination device may be a DMX interface. However, it should be understood that any other interface allowing a communication between the illumination device and other illumination devices or a color control system may be used.

The invention furthermore relates to a color control system comprising at least one illumination device as mentioned above. The color control system furthermore comprises a color controller adapted to generate the input signal for the at least one illumination device, the color controller comprising an interface adapted to connect the color controller to the at least one illumination device. Furthermore, an actuating element is provided configured to adapt an adjustment parameter, the adjustment parameter being indicative of a degree of adjustment of the predefined color gamut to the actual color gamut. The color controller can determine an operating status of the actuating element and is adapted to generate the input signal including the adjustment parameter. The color controller adapts the input parameter based on the determined operating status of the actuating element.

With the actuating element in the color control system an operator of the color control system can determine the adjustment parameter and can thus determine to what extent the adjusted color gamut corresponds to the actual or the predefined or common color gamut.

The invention furthermore relates to a method for controlling a color of an illumination device wherein an input signal is received indicative of at least a color and/or brightness to be emitted by the illumination device. The input signal further comprises the adjustment parameter which is indicative of a degree of adjustment of the predefined color gamut to the individual color gamut. The adjustment parameter is retrieved from the input signal and the adjusted color gamut is generated based on the actual color gamut, based on the predefined color gamut and based on the adjustment parameter. Furthermore, an activation signal for the plurality of LEDs is generated based on the adjusted color gamut.

BRIEF DESCRIPTION OF THE DRAWINGS

The invention will be described in further detail below with reference to the accompanying drawings.

DETAILED DESCRIPTION

Figure 1:
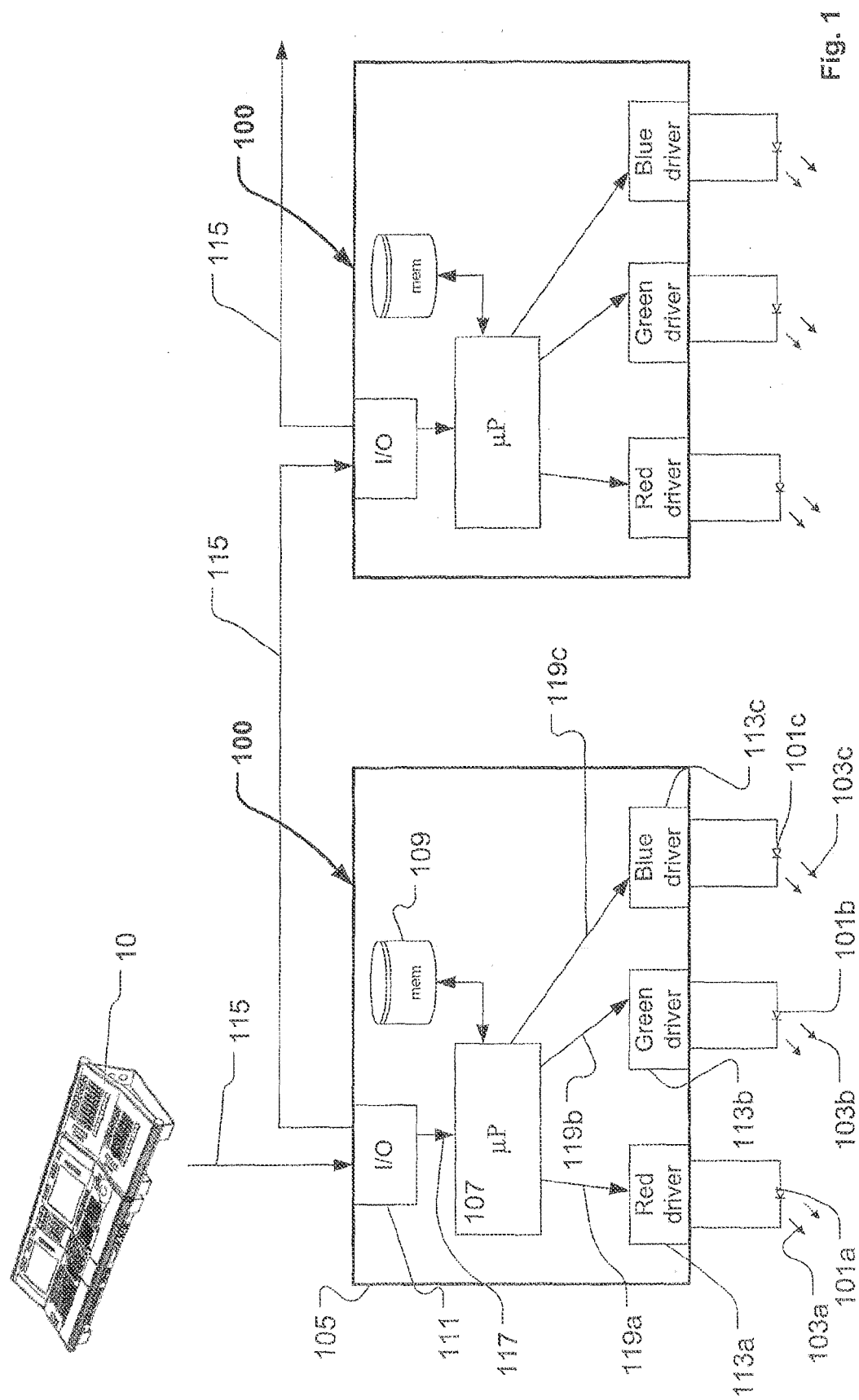
FIG. 1 is a schematic view of a color control system which allows a variable weighting between a calibrated mode and a raw mode incorporating features of the invention.

FIG. 1 illustrates a structural block diagram of an illumination system comprising at least one illumination device 100 according to the present invention. The illumination system comprises a central color controller 10 adapted to generate an input signal 115 for the illumination devices 100 connected to the illumination system. In the illustrated embodiment two illumination devices 100 according to the present invention are shown, however it is noticed that any positive number of illumination devices can be connected to the color controller 10.

The illumination device 100 comprises a first LED 101a emitting light 103a having a first color, a second LED 101b emitting light 103b having a second color and a third LED 101c emitting light 103c having a third color. In the illustrated embodiment the first LED emits red light, the second LED emits green light and the third LED emits blue light.

It should be understood that more than three light sources may be used by each illumination device. By way of example, a white light source may be additionally provided in order to create a higher color rendering performance at white colors. Furthermore, six light source such as cyan, magenta, yellow, red, green and blue light sources may be provided. Further it is to be understood that alternatively the first LED, the second LED and the third LED each can be embodied as a string of LEDs.

The illumination device 100 comprises a processing unit 107, a memory 109, a first LED driver 113a, a second LED driver 113b and a third LED driver 113c.

An input/output interface 111 is adapted to receive the input signal 115 indicative of a number of control parameters relating to at least a color and/or brightness of the light, which the illumination device must create. However the input signal may also be indicative of parameters such as strobing, position (in cases the illumination device is a moving head light fixture), light effects, predetermined light effect functions or other kind of parameters known in the art of intelligent lighting. The input signal can for instance be based on the DMX, ARTnet, Ethernet or any other communication protocol. The interface is thus adapted to extract the control parameters from the input signal 115 and to pass the control parameters to the processing unit 107 as illustrated by arrow 117. Alternatively the input signal can also be an electronic signal internally within the illumination device for instance carried on a databus transmitting data from an internal memory. This makes it possible to provide a stand-alone illumination device where the controlling instructions are stored in the memory 109.

The light from the first, second and third LEDs can be combined into a light beam and the processor can control the color of the light beam by regulating the intensity of the individual colors as known form the art of additive color mixing. The processing unit 107 is thus adapted to control the first 101a, second 101b and the third 101c LEDs based on the control parameters received from the input signal 115 and is adapted to pass a first control signal 119a, a second control signal 119b and a third control signal 119c, respectively, to the first LED driver 113a, the second LED driver 113b and the third LED driver 113c.

The first LED driver 113a is adapted to generate a first activation signal for the first LED 101a and the first LED 101a emits light 103a in response to the first activation signal. The second LED driver 113b is adapted to generate the second activation signal for the second LED 101b and the second LED 101b emits light 103b in response to the second activation signal. The third LED driver 113c is adapted to generate a third activation signal for the third LED 101c and the third LED 101c emits light 103c in response to the third activation signal.

The first, second and third activation signal may be any electrical signal respectively capable of activating the first 103a, second 103b and 103c third LEDs. For instance the first and second LED driver can be adapted to force current through the LEDs whereby the LEDs will emit light. As consequence a voltage is generated across the LEDs. The first and second activating signals are thus controlled by the processing unit and the intensity of each LED can be increased by increasing the current and be decreased by decreasing the current. The current can be regulated as a DC, AC, PWM or any combinations as known in the art of intelligent lighting and power electronics.

In the illustrated embodiment the memory 109 comprises colorimetric data indicative of colorimetric properties of said light emitted by the LEDs. The colorimetric properties can be any property indicating of the color information of the emitted light for instance spectral information, color vectors mapping the color of the light in a color map, coordinates in the CIE color map diagram or intensity/radiated power of each color.

Figure 2:
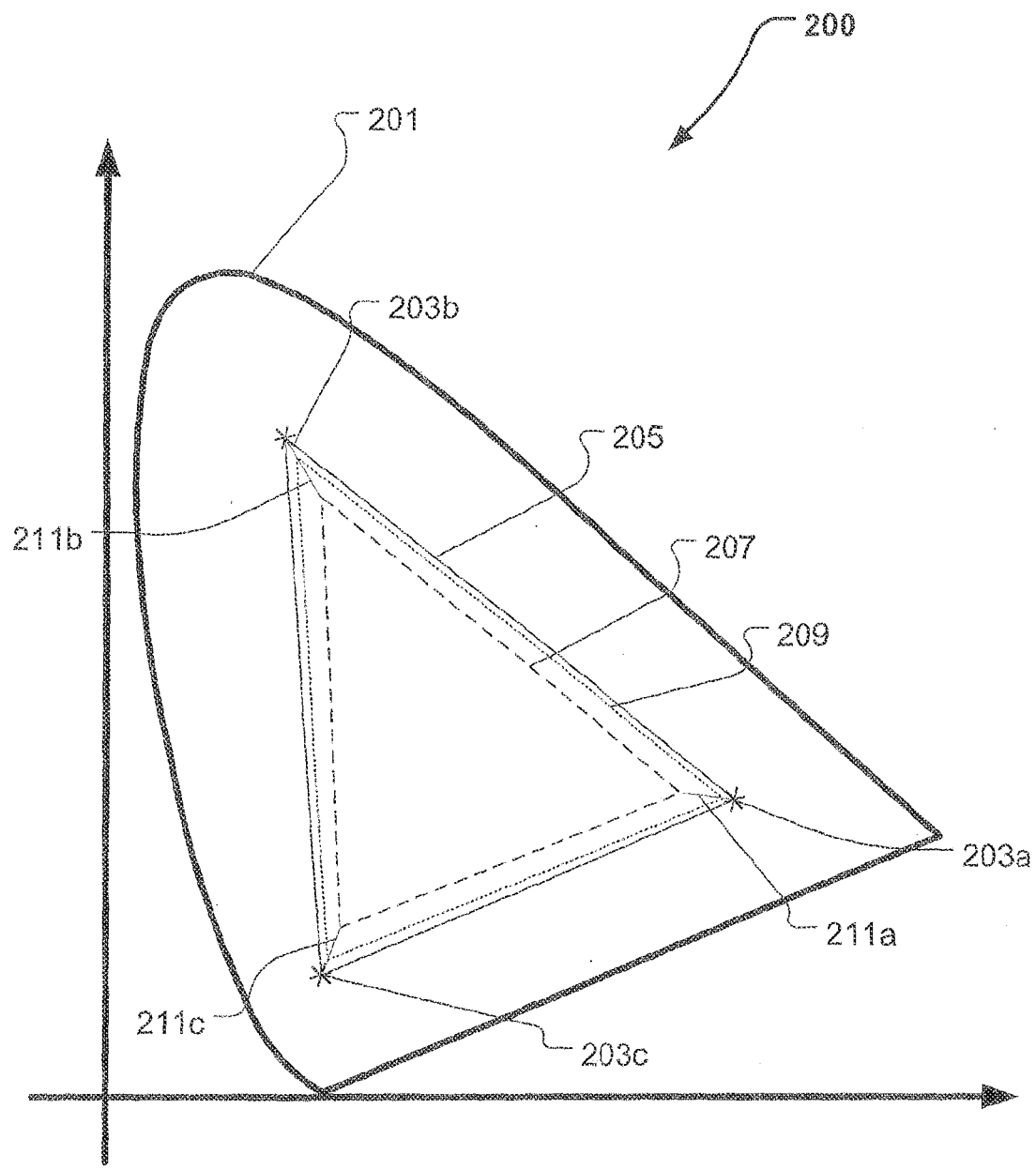
FIG. 2 illustrates a CIE 1931 color diagram, which helps to understand certain aspects of the invention including a predefined/common gamut, an actual color gamut and an adjusted color gamut.

FIG. 2 illustrates the CIE color map where the outer boundary of the map is indicated by line 201. The colorimetric properties of the LED's are indicated as color points 203a. 203b, 203c in the CIE color map and the color points define the actual color gamut of the illumination device 205 (indicated in solid line). The actual color gamut defines the colors which can be generated by the illumination device, as all colors inscribed by the actual color gamut can be generated by the illumination device.

Further a predefined color gamut 207 (indicated in dashed lines) is stored in the memory 109. Typically the predefined color gamut is defined by the manufacturer of the illumination devices based on the variations in colorimetric properties of the LEDs provided by the LED manufacturer. Typically the predefined color gamut is defined based on the statistical color distribution of light sources and often chooses such that all illumination devices or most of the illumination devices generate can the colors within the predefined color gamut.

The units (the processing unit 107 and drivers 113a-113c) for generating the activation signals are adapted to generate the activation signal based on an adjusted color gamut, where said adjusted color gamut 209 (indicated in dotted lines) is generated based on the predefined color gamut and the colorimetric data.

In one embodiment the adjusted color gamut can be generated based on an adjustment parameter, where the adjustment parameter is indicative of the degree of adjustment of said predefined color gamut. For instance the adjustment parameter can be indicative of how "close" the adjusted color gamut shall be to the predefined color gamut. The adjustment parameter can be preset by the user and stored directly in the illumination device, for instance through an user input system (display and bottoms and/or touch screen) at the illumination device. In one embodiment the adjustment parameter is sent through the input signal and can thus be set remotely at the central controller 20 shown in FIG. 1.

The central controller 10 comprises a processing unit provided to control the functioning of the controller 10. The controller 10 comprises an interface via which the controller 10 communicates with the different illumination devices 100. The processing unit may generate the input signal 115, which includes the control parameters relating to, as described above, inter alia the color and/or brightness of the light the different illumination devices should create. The controller 10 may generate the input signal completely and/or partly and may receive the color and/or brightness values or other parameters from another unit, e.g. a show controller which provides the information to the color controller, e.g. the time dependent colors to be generated by the illumination system comprising the different illumination devices 100. By way of example, a predefined illumination program may be provided to the processing unit or may be stored in a storage unit of the controller 10.

The controller 10 furthermore comprises several actuating elements. The actuating elements may be incorporated as rotary knobs, faders or as virtual actuating elements shown on a touch-sensitive display. The operator of the controller 10 can use this actuating element to change the adjustment parameter, e.g. from a value which indicates that the adjusted color gamut should correspond to the predefined color gamut to another value that the adjusted color gamut should correspond to the actual color gamut of the illumination device. By way of example, the color to be emitted by the illumination device can be a weighted average with the adjustment parameter indicting the weighting of the adjusted color gamut. By way of example, the adjusted color gamut may be described as follows:

$$G_{ad} = A1 \cdot G_p + A2 \cdot G_a.$$

In this formula, $G_{ad}$ is the adjusted color gamut $G_p$ is the predefined color gamut and $G_a$ is the actual color gamut. The parameters A1 and A2 indicate the weighting of the two gamuts with A1+A2=1. The user can now adjust, based on the actuating element, whether the adjusted color gamut should correspond to the predefined color gamut or whether it should correspond to the actual color gamut or whether it should be a mixture, the parameters A1 and A2 indicating to which extent each of the actual or predefined color gamut contribute to the adjusted color gamut. If parameter A1 is 0, then the adjusted color gamut corresponds to the actual color gamut, and if the parameter A2 is 0, the adjusted color gamut corresponds to the predefined color gamut. In a pure calibrated mode only the predefined color gamut may be used as in this mode it is assured that each illumination device 100 controlled by the controller 20 emits the same color when the predefined color gamut is the common color gamut. This adjustment parameter can then be incorporated into the DMX signal communication protocol that is used to control the illumination devices.

In one embodiment the adjusted color gamut is generated by an interpolation between the predefined color gamut 207 and the actual color gamut 205 defined by the colorimetric properties of the LED 203a-203c. In this embodiment the adjustment parameter can be indicative of the degree of interpolation between the predefined color gamut and the actual color gamut.

In FIG. 2 the interpolation is indicated as a linear interpolation, where points (the corners) of the predefined color gamut that are furthest from the actual color points are moved linearly towards to the actual color points 203a-203c. As a consequents the corners of the predefined color gamut moves along line 211a-211b-211c. The adjustment parameters can adjust the weighting between the actual color points and the corners of the predefined color gamut and thus define how close the corners of the adjusted color gamut lies on the interpolation line.

Figure 3:
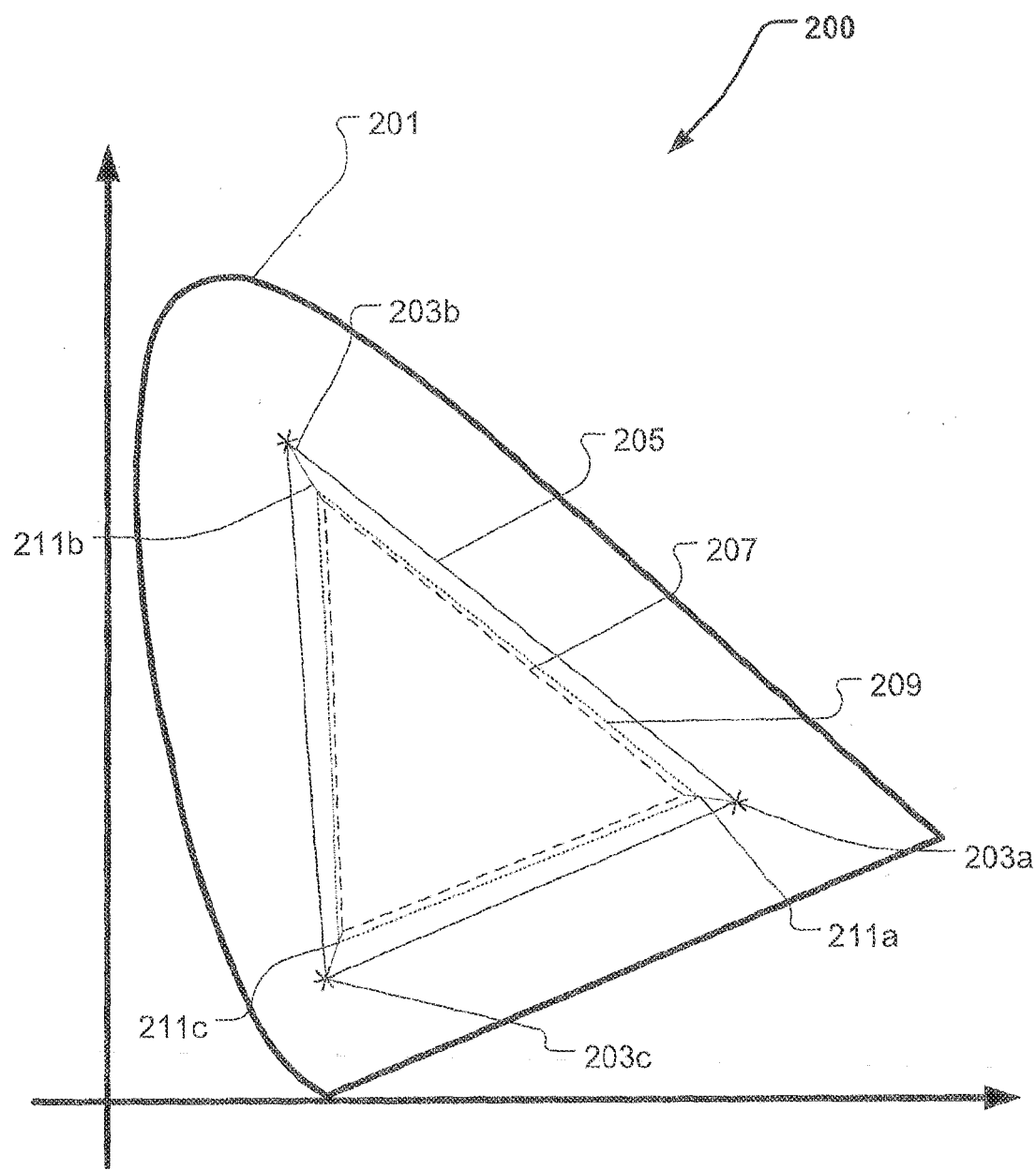
FIG. 3 the color diagram of FIG. 2 with another adjusted color gamut.

In FIG. 2 the adjusted color gamut 209 is illustrated closer to the actual color gamut 205 meaning that the weighting between the actual color points and the predefined color gamut is in favor of the actual color points. In FIG. 3 the adjusted color 209 gamut is illustrate closer to the predefined color gamut 207 and this means that the weighting between the actual color points and the predefined color gamut is in favor of the predefined color gamut.

The illumination device is adapted to receive said adjustment parameter through said input signal and the light designer can thus control the degree of adjustment of the adjusted color gamut.

Figure 4:
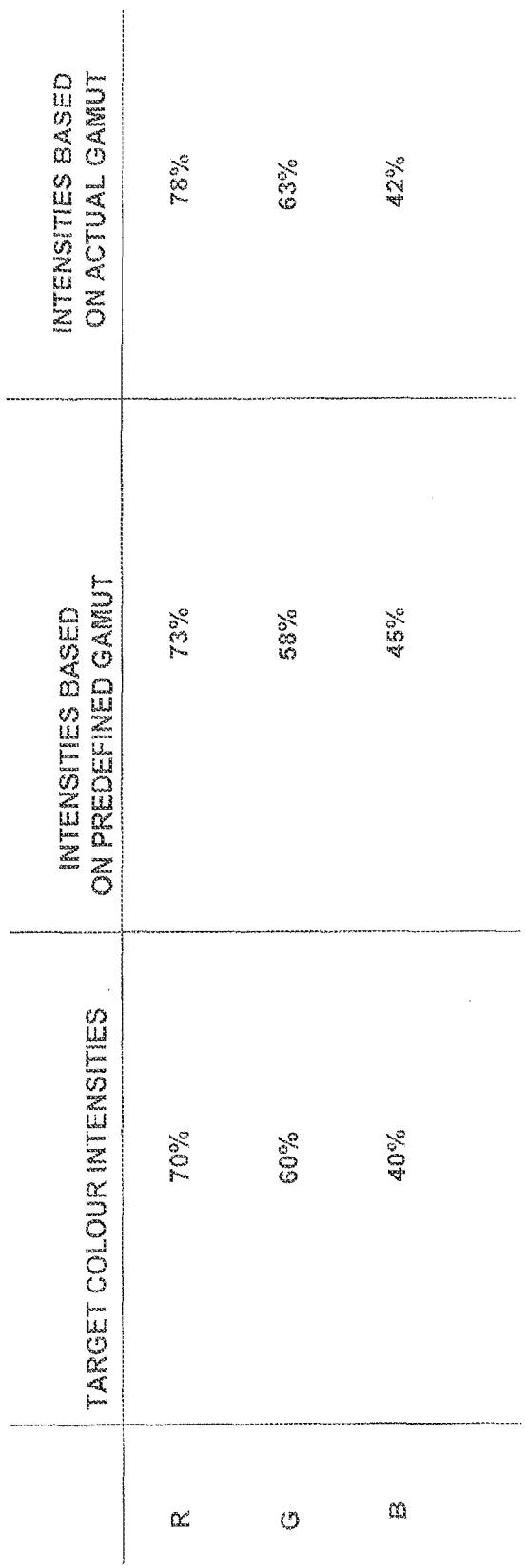
FIG. 4 illustrates a table with target color intensities and intensities based on the predefined and actual color gamut.
Figure 5:
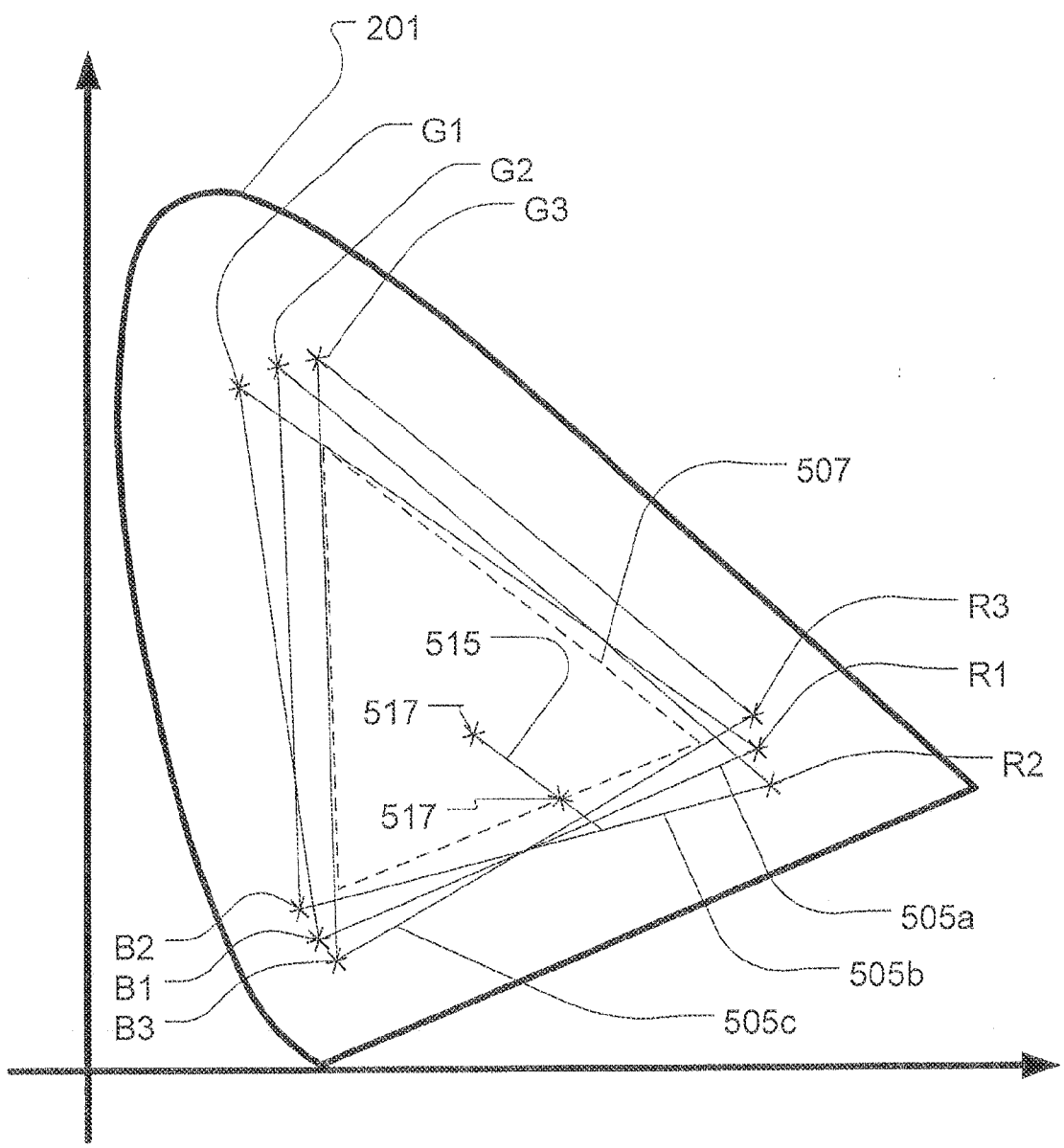
FIG. 5 illustrates a CIE 1931 color diagram which illustrates the generation of the predefined or common color gamut.

In the example shown in FIG. 5 the actual color gamut of three different illumination devices is shown. the red light sources may be the points R1, R2 and R3, the green light sources may be the points G1, G2 and G3 and the blue light sources may be the points B1, B2 and B3 if a system of three illumination devices is used with three LEDs per illumination device. The actual color gamut 505a of the first illumination device is thus defined by color points, R1, G1 and B1; the actual color gamut 505b of the second illumination device is thus defined by color points, R2, G2 and B2 and the actual color gamut 505c of the third illumination device is thus defined by color points, R3, G3 and B3. The color points of light source represented in FIG. 5 in the color diagram is shown in an exaggerated way in order to show that each light source may have a slightly different color; however it is noticed that in most applications the color points of the light sources having the same color is much closer. The color that a device 100 can emit is represented by its corresponding color gamut defined by the three different light sources. FIG. 5 shows in the dashed line the common or predefined gamut 507, this predefined gamut indicating the colors that all illumination devices can generate simultaneously. The predefined common color gamut 507 may have been determined by the manufacturer based on the statistical color values of the used light sources and can be defined such that the probability an illumination device provided with the light sources will be able to create the colors with in the predefined color gamut 510 is high. This predefined common gamut will thus contain the maximum colors that can be processed non-simultaneously by different illumination devices. As can be seen in FIG. 5, the predefined common color gamut contains the minimum number of colors that can be generated by all of the illumination devices and in many cases the actual color gamut of the illumination devices is larger and the illumination device can thus produce more colors. In some embodiments it may be desirable to achieve colors on some devices 100 that are outside the common predefined gamut 510 and within the maximum actual color gamuts 505*a*. 505*b*, 505*c*, The method according the present makes it possible for the user expand the possible color of the illumination devices by controlling the color of the illumination devices based on am adjusted color gamut as described above. This make it possible to provide more saturated colors and makes it possible for the user to expand the adjusted color gamut until an acceptable color saturation is achieved and still keep the color differences under control. For instance in FIG. 5 the line 515 indicates a desired color point and the further away from the white point 517 the more saturated the color is. If the predefined color gamut is used all illumination devices will create the color 517 at the boundary at the predefined color gamut. However as can be seen all illumination devices can actually create colors outside the predefined common color gamut 510 and by adjusting the color based on the adjusted color gamuts makes it possible to adjust the color gamuts used when creating the color. As a consequence more saturated colors along line 515 can be reached. The ratio between the predefined color gamut and the actual color gamuts can be the same for all light fixtures or it can be regulated individual for the light fixtures. Referring back to FIG. 1, the controller 20 can provide the information which colors should be generated by which of the illumination devices over time. The controller 20 can at the same time provide the target intensity parameters shown in the left column of FIG. 4, in the example shown the intensity parameters 70%, 60% and 40%. The target intensities may also be calculated by the processing unit 22.

The processing unit 107 in each illumination device receives the target color intensity parameters as shown in the left column of FIG. 4. Based on the predefined color gamut, the processing unit can then determine that based on the predefined color gamut the intensity parameters shown in the center column of FIG. 4 such as 73%, 58% and 45% should be used in order to generate the target color represented by the target color intensity parameters shown in the left column of FIG. 4. The processing unit 107 can furthermore determine that if the actual color gamut is used, the intensity parameters based on the actual color gamut have to be 78%, 63% and 42% as shown in the right column of FIG. 4. It should be understood that the given Figures are only examples indicating how the target color intensities are adapted based on the predefined gamut or the actual gamut. Using the adjustment parameter, the operator of the controller 20 can determine whether in a calibrated mode the intensity parameters based on the predefined color gamut should be used or whether in the raw mode the actual color gamut and the corresponding intensity parameters should be used.

The color gamut point needs not to be described using the RGB mode as described above. It is also possible to use an HSI mode (hue, saturation, intensity) where also a variable weighting using the adjustment parameter between the actual and the predefined case color gamut is possible.

With the present invention, the operator of the controller 20 can determine whether the uniformity in color is desired or whether saturation in the colors is the more important aspect. By way of example, it may be desirable to generate a color 253 shown in FIG. 5. This color is outside the common color gamut 207; however, some of the illumination devices may be able to generate this color. When the common color gamut is used, this would mean that color point 254 would be used. As the color points with most saturation lie on the other curve of each gamut, it can be deduced that using the common color gamut, the color would be less saturated compared to an embodiment where the light fixtures, if possible by the individual gamut, use color point 253. In this case, the user could with the present invention use the adjustment parameter to indicate whether the color should be generated using the actual gamut or the predefined gamut or in between.

In the embodiment described above, the adjustment parameter was amended using user interaction. In another embodiment, the parameter could be implemented in such a way that the predefined gamut is automatically used at 100% until the limits of the color saturation or in other words until the borders of the predefined color gamut are reached. In the space outside the predefined gamut 207, in the color space between the gamut 207 and the maximum gamut 210, the adjustment parameter may be switched to gradually going over to the actual color gamut. In the HSI mode, when it is run with hue, the colors will go together as long as possible and the individual products will be at the nearest color point when they cannot follow to the deeper, more saturated color. The further away point 253 is located from the adapted color gamut, the more the actual gamut can be used.

The invention claimed is:

1. An illumination device, comprising:
a plurality of light emitting diodes (LEDs) configured to emit light in different source colors, the light of the illumination device being obtained by a combination of the source colors of the plurality of LEDs;
an interface adapted to receive an input signal indicative of at least one of a color and a brightness to be emitted by the illumination device;
a storage unit that includes colorimetric data indicative of colorimetric properties of the light emitted by the plurality of LEDs, wherein the colorimetric properties of the LEDs define an actual color gamut of the illumination device, and further includes predefined color gamut data indicative of a predefined color gamut; and
a processing unit adapted to generate an adjusted color gamut based on the actual color gamut and the predefined color gamut and to generate an activation signal for the plurality of LEDs based on the input signal and the adjusted color gamut,
wherein the interface is further adapted to receive an adjustment parameter indicative of a degree of interpolation between the actual color gamut and the predefined color gamut, and
wherein the processing unit is further adapted to generate the adjusted color gamut based on the received adjustment parameter.

2. The illumination device according to claim 1, wherein the processing unit generates the adjusted color gamut based on the received adjustment parameter by interpolating between the predefined color gamut and the actual color gamut.

3. The illumination device according to claim 1, wherein the adjustment parameter indicates weighting coefficients of at least one of the actual color gamut and the predefined color gamut, and the processing unit is adapted to generate the adjusted color gamut based on the adjustment parameter as a weighted average of the actual color gamut and the predefined color gamut.

4. The illumination device according to claim 1, wherein the adjustment parameter is included in the input signal, and the processing unit is adapted to extract the adjustment parameter from the input signal.

5. The illumination device according to claim 1, wherein the adjustment parameter is a value within a value range having a first limit and a second limit, the first limit indicating that the adjusted color gamut corresponds to the predefined color gamut, the second limit indicating that the adjusted color gamut corresponds to the actual color gamut, and wherein the processing unit is adapted to generate the adjusted color gamut based on the value of the adjustment parameter.

6. The illumination device according to claim 1, wherein the interface comprises a DMX interface.

7. A color control system, comprising:
at least one illumination device that includes:
a plurality of light emitting diodes (LEDs) configured to emit light in different source colors, the light of the illumination device being obtained by a combination of the source colors of the plurality of LEDs,
a first interface adapted to receive an input signal indicative of at least one of a color and a brightness to be emitted by the illumination device,
a storage unit that includes colorimetric data indicative of colorimetric properties of the light emitted by the plurality of LEDs, wherein the colorimetric properties of the LEDs define an actual color gamut of the illumination device, and further includes predefined color gamut data indicative of a predefined color gamut, and
a processing unit adapted to generate an adjusted color gamut based on the actual color gamut and the predefined color gamut and to generate an activation signal for the plurality of LEDs based on the input signal and the adjusted color gamut,
wherein the first interface is further adapted to receive an adjustment parameter indicative of degree of interpolation between the actual color gamut and the pre-defined color gamut, and
wherein the processing unit is further adapted to generate the adjusted color gamut based on the received adjustment parameter; and a color controller adapted to generate the input signal for the at least one illumination device, the color controller comprising a second interface adapted to connect the color controller to the at least one illumination device, and an actuating element configured to modify the adjustment parameter, wherein the color controller is further adapted to determine an operating status of the actuating element, adapt the input parameter based on the operating status of the actuating element, and to generate the input signal to include the adjustment parameter.

8. A method for controlling a color of an illumination device, the illumination device comprising a plurality of light emitting diodes (LEDs) emitting light in different source colors, the light of the illumination device being obtained by a combination of the source colors of the plurality of LEDs, wherein the illumination device includes colorimetric data indicative of colorimetric properties of the light emitted by the plurality of LEDs, wherein the colorimetric properties of the LEDs define an actual color gamut of the illumination device, and further includes predefined color gamut data indicative of a predefined color gamut, the method, comprising:

receiving an input signal indicative of at least of a color and a brightness to be emitted by the illumination device, the input signal further comprising an adjustment parameter that is indicative of a degree of interpolation between the actual color gamut and the predefined color gamut, retrieving the adjustment parameter from the input signal, generating the adjusted color gamut based on the actual color gamut, the predefined color gamut, and the adjustment parameter, generating an activation signal for the plurality of LEDs based on the adjusted color gamut.

* * * * *